July 20, 1926.
M. E. UNDERWOOD
CHECK VALVE
Filed April 2, 1925
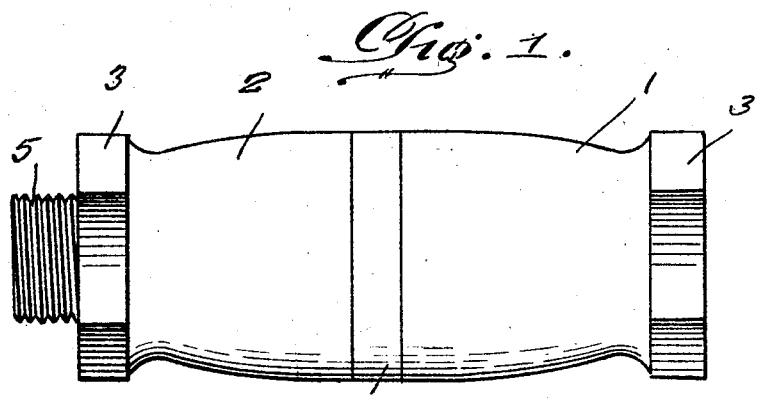
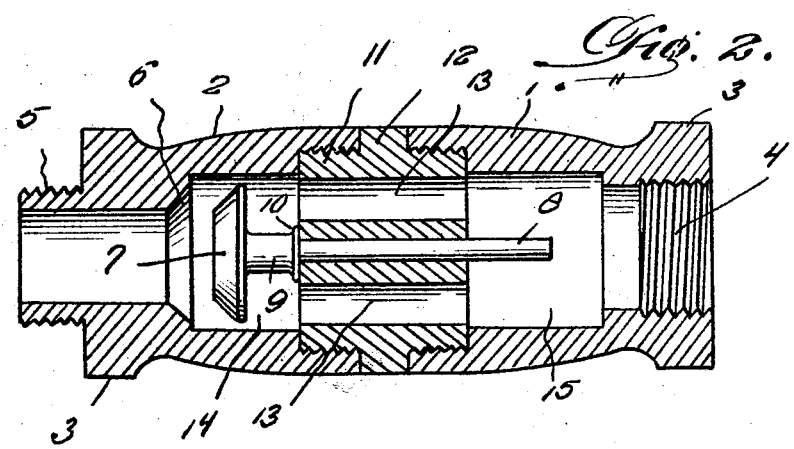
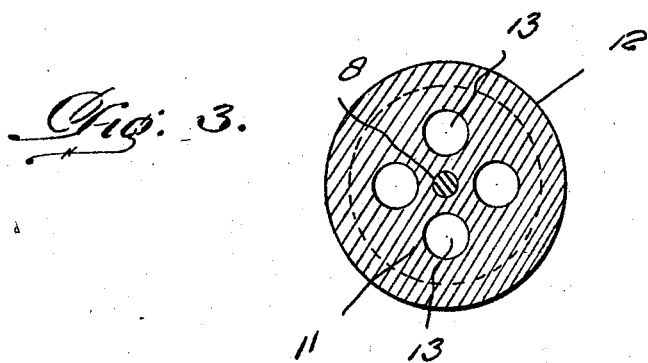
Inventor
M. E. Underwood
By
Attorney Patented July 20, 1926.

1,593,519

UNITED STATES PATENT OFFICE.

MALERY E. UNDERWOOD, OF CLARKS, LOUISIANA.

CHECK VALVE.

Application filed April 2, 1925. Serial No. 20,191.

This invention relates to an improved check valve adaptable for general use in fluid lines, the same being highly efficient whether used in connection with air, gas, water or steam.

The outstanding feature of the invention is the inclusion of a novel guide employed for insuring positive and accurate seating of the valve, this guide being associated with the especially constructed valve in a manner to permit unhampered flow of fluid therethrough.

The particular structural details for accomplishing this end will become clearly apparent from the following description and drawing.

In the accompanying drawing forming a part of this application and in which like numerals are employed to designate like parts throughout the same:

Figure 1 is a side elevation of a check valve constructed in accordance with the present invention.

Figure 2 is a central longitudinal section therethrough.

Figure 3 is a central cross section.

The improved valve is composed of a housing made up of sections 1 and 2, both of which are provided at their outer ends with polygonal or hexagonal portions 3 to accommodate a wrench in installing the valve. The right hand section 1 is internally screw threaded as at 4 for reception of one end of a pipe. The other section is provided with screw threaded nipple 5 to permit it to be inserted into and connected with another length of the pipe. It will be observed from Figure 2 that the nipple carrying end of the section 2 is thickened somewhat and fashioned as at 6 to provide a beveled valve seat. Cooperable with this seat is a mushroom valve 7 provided with a cylindrical valve stem 8. It will be noted that the portion 9 of this valve stem is increased somewhat in diameter and is provided with a flange 10 constituting a stop. The reduced portion of the valve stem is slidable through a central bore formed in a guide 11 clamped tightly between the two housing sections. The guide is in the form of an externally screw threaded collar, and is provided with a central annular rib 12, while the opposed ends of the sections are counter-bored, and screw threaded, to permit them to be connected with threads on the collar. The ends of these sections abut the rib. This guide collar is formed with circumferentially spaced passages 13 to permit passage of fluid therethrough from the chamber 14 on the intake side to the chamber 15 on the discharge side.

The feature, as before stated, to be noted, is that the valve head 7 is of a diameter to afford sufficient clearance between its periphery and the walls of the chamber 14 to permit comparatively free flow of the fluid. Also, the stop collar 10 is located at a point spaced from the valve head and is adapted to abut the guide collar 11 to space the valve head from the intake ends of the passages 13. Thus, it will be seen that I have evolved and produced a novel check valve permitting free flow of fluid and one in which the valve is accurately guided to its seat to insure efficient seating after each operation. A valve of this kind is proficient when used horizontally, or vertically. When used horizontally, the back pressure of the fluid is depended upon for seating the valve. When used vertically however, gravity comes into play to insure positive seating of the valve.

It is believed that persons skilled in the art to which the invention relates will be able to obtain a clear comprehension of the invention from the foregoing description and illustration in the drawing. For this reason a more lengthy description is thought unnecessary.

While the preferred embodiment of the invention has been specifically described and shown, it is to be understood that minor changes coming within the field of invention claimed may be resorted to if desired.

Having thus described the invention, what I claim is:—

A check valve comprising a pair of complementary tubular sections, the inner opposed ends of which are internally threaded, a collar having its end portions externally threaded for engagement with the respective internally threaded inner ends of the sections, an annular rib formed on the intermediate portion of the collar, the inner ends of the sections engaging the respective faces thereof, one of the sections being provided with a valve seat, a longitudinally reciprocable valve in the housing cooperating with the seat, said valve including a head and a guide stem, the collar being provided with a central bore through which the stem is adapted to slide, and a stop formed on the valve stem adjacent said head for limiting the sliding movement of the valve in one direction, the collar being provided with an annular series of fluid passages.

In testimony whereof I affix my signature.

MALERY E. UNDERWOOD.